(12) United States Patent
Hill et al.

(10) Patent No.: US 7,520,373 B2
(45) Date of Patent: Apr. 21, 2009

(54) ELECTROMAGNETIC FRICTION CLUTCH

(75) Inventors: Wolfgang Hill, Karlsruhe (DE); László Mán, Ottersweier-Unzhurst (DE); Wolfgang Reik, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 637 days.

(21) Appl. No.: 10/820,093

(22) Filed: Apr. 7, 2004

(65) Prior Publication Data

US 2004/0256192 A1 Dec. 23, 2004

(30) Foreign Application Priority Data

Apr. 7, 2003 (DE) ................. 103 15 823

(51) Int. Cl.
*F16D 27/115* (2006.01)
(52) U.S. Cl. .............. 192/84.31; 192/84.91; 192/84.961
(58) Field of Classification Search .............. 192/84.96, 192/84.961, 84.95, 84.951, 84.31, 84.91
See application file for complete search history.

(56) References Cited

U.S. PATENT DOCUMENTS

| | | | |
|---|---|---|---|
| 5,119,918 A | | 6/1992 | Pardee ...................... 192/18 B |
| 5,242,040 A | * | 9/1993 | Koitabashi ............. 192/84.961 |
| 5,404,980 A | * | 4/1995 | Shafer ...................... 192/84.96 |
| 5,551,546 A | * | 9/1996 | Tabayama et al. ......... 192/84.96 |
| 5,735,375 A | * | 4/1998 | Booth et al. ........... 192/84.961 |
| 5,996,759 A | * | 12/1999 | Aoki et al. ............. 192/84.951 |
| 6,098,770 A | * | 8/2000 | Isley, Jr. ...................... 192/35 |
| 6,158,561 A | * | 12/2000 | Sakai et al. .................... 192/35 |
| 6,619,453 B2 | * | 9/2003 | Stretch ...................... 192/21.5 |
| 2004/0134736 A1 | * | 7/2004 | Ando et al. .................... 192/35 |

FOREIGN PATENT DOCUMENTS

EP 0537 022 4/1993

\* cited by examiner

*Primary Examiner*—Richard M. Lorence
(74) *Attorney, Agent, or Firm*—Davidson, Davidson & Kappel, LLC

(57) ABSTRACT

An electromagnetic friction clutch has at least two clutch parts that are mounted so as to be rotatable relative to each other and movable toward and away from each other and that touch each other with a contact force in the position of use. The clutch parts are located in a magnetic circuit, which is guided in the clutch parts in a soft magnetic material in sheet form. Positioned in the magnetic circuit is an electromagnet having a soft magnetic core and a coil. The magnetic circuit has air gaps between the soft magnetic core and at least one of the clutch parts. The flux density in the magnetic circuit, and thus the contact force, is modifiable via the current applied to the coil. The magnetic flux changes at least ten flux crossover points one after the other in the direction of flow between the clutch parts. The cross section of the magnetic flux in at least one air gap is at least five times greater than the smallest flux cross section in the soft magnetic material.

30 Claims, 4 Drawing Sheets

ELECTROMAGNETIC FRICTION CLUTCH

This claims the benefit of German Patent Application DE 103 15 823.5, filed Apr. 7, 2003 and hereby incorporated by reference herein.

BACKGROUND INFORMATION

The present invention relates to an electromagnetic friction clutch having at least two clutch parts that are mounted so as to be rotatable relative to each other and may be pressed against each other by the magnetic force of a magnetic circuit guided in the clutch parts in a soft magnetic material, at least one electromagnet being situated in the magnetic circuit to change the magnetic flux in the clutch parts.

A friction clutch of this sort for a lawnmower is known from European Patent Document 0 537 022 B1. The clutch has a first clutch part, configured in a cup-shaped manner and positioned on a drive shaft of a motor, and a second clutch part, parallel to the floor of the cup-shaped clutch part and having an approximately disk-shaped configuration. The second clutch part is joined by leaf springs in a rotationally fixed manner with a belt pulley that has a drive connection with a cutting blade, the belt pulley being also positioned on the drive shaft, and being rotatable relative to the drive shaft via a bearing. The second clutch part is movable axially to the drive shaft relative to the first clutch part and may be moved into an engaged position, in which it is in contact with the first clutch part in a frictionally engaged manner, and into a disengaged position in which it is offset from the first clutch part. To engage the second clutch part, there is an electromagnet, which has a field housing and a coil for producing a magnetic flux. The field housing is part of a magnetic circuit passing through the clutch parts and running in a soft magnetic material and across air gaps. The magnetic circuit is guided into the clutch parts in such a way that the magnetic flux changes between the clutch parts at six flux crossover points located one after another in the direction of flux. The friction clutch has the disadvantage that the time for switching the friction clutch between the engaged ("adhering") and the disengaged ("slipping") positions is still relatively long. The friction clutch is therefore not suitable in practice for applications in which quick engagement and disengagement are necessary. Since the clutch parts that are rotatable relative to each other do not have a defined rotational position relative to one another, the clutch is also not usable for applications in which a predefined angle of rotation between the clutch parts must be set.

BRIEF SUMMARY OF THE INVENTION

An object to provide a friction clutch of the type indicated at the outset, which enables quick engagement and disengagement and/or simple detection of the angle of rotation existing between the clutch parts.

The present invention provides that the magnetic circuit is guided in the clutch parts in such a way that the magnetic flux changes between the clutch parts at at least ten flux crossover points located one after another in the direction of flux. In an advantageous manner, this unusually large number of flux crossover points allows adequate force for the frictional engagement of the clutch parts, even when the flux cross section in the soft magnetic material is relatively small. Therefore, only a relatively small volume must be magnetized in the magnetic circuit for a magnetic flux to be built up or reduced, and, as a result, relatively little energy must be expended, i.e., the magnetic flux in the magnetic circuit is quickly changeable by applying appropriate current to the coil of the electromagnet. That makes highly dynamic adjustment of the friction clutch possible. The soft magnetic material may also be a powder composite material.

The present invention also provides for five flux crossover points and for the soft magnetic material to be at least sectionally configured as a laminated core having layers that are electrically insulated from each other at right angles to the direction of flux. In an advantageous way, this measure significantly reduces the formation of eddy currents in the soft magnetic material that work against a change in the magnetic flux in the magnetic circuit, even when the electromagnetic friction clutch is engaged and/or disengaged quickly. Nevertheless, a low magnetic resistance is achieved in the soft magnetic components—preferably via low-alloy FeSi layers—so that a change in the contact force requires only a relatively small change in the magnetic energy. The friction clutch thus makes high adjustment dynamics possible.

The present invention also provides that the electromagnet has a coil and a soft magnetic core, and the magnetic circuit having air gaps between the soft magnetic core and at least one of the clutch parts, and that the cross section of the magnetic flux in at least one air gap is at least five times as large as the smallest flux cross section in the soft magnetic material of the magnetic circuit. Because of this unusually large air gap area, the volume in the air gap increases correspondingly, but at the same time the flux density in the air gap decreases in inverse proportion to the volume increase. Since the magnetic energy in the air gap behaves in a quadratic manner with respect to the flux density but only proportionally to the air gap volume, the overall result in the air gap is a low magnetic energy. As a result, this approach also requires only a low magnetic energy to be built up or reduced in the air gap and as such also in the magnetic circuit, in order to adjust the friction clutch, thereby making high adjustment dynamics possible. An air gap is understood as a gap through with the magnetic flux flows and in which the relative magnetic permeability corresponds approximately to that of air. The air gap may be filled with a gaseous and/or a liquid medium, or may contain a vacuum. The magnetic flux in both air gaps is preferably at least five times as large as the smallest flux cross section in the magnetic circuit. The magnetic energy is thus reduced at the points in the magnetic circuit at which it is greatest, and hence reduction is most effective.

In a preferred embodiment of the present invention, the cross section of the magnetic flux in the air gaps is at least six times, possibly seven, in particular eight, and preferably ten times greater than the smallest flux cross section in the soft magnetic material. The friction clutch then allows even greater adjustment dynamics.

It is especially advantageous if a first clutch part has at least two clamping jaws that are movable toward and away from each other, if a second clutch part is positioned between these clamping jaws, and if the soft magnetic material of the clutch parts is positioned so that the magnetic flux changes at least once from the one clamping jaw through the second clutch part to the other clamping jaw and possibly from the latter back through the second clutch part to the first-named clamping jaw. Thus, each time the magnetic flux passes through the second clutch part, a changeover of the magnetic flux from the one clutch part to the other takes place at two flux crossover points located on both sides of the second clutch part. This makes it possible to achieve a large number of flux changes, and hence a correspondingly large contact or friction force of the clutch parts, in a simple way and in a small space.

It is advantageous if at least one clutch part has at least one non-ferromagnetic support, on which a plurality of flux conductors made of the soft magnetic material are positioned at a distance from each other, each joining at least two flux crossover points with one another. The individual flux conductors then have high magnetic resistance crosswise to the direction of the magnetic flux, so that practically the entire magnetic flux passes through the flux crossover points. The friction clutch thereby enables an even greater contact or friction force between the clutch parts.

In an appropriate embodiment of the present invention, the flux conductors have an approximately U-shaped cross section, the free ends of their U-legs facing the flux crossover points. This results in a compact construction of the soft magnetic circuit. In addition, the U-shaped flux conductors permit inexpensive manufacture of the clutch part, since all flux conductors are prefabricated as single-piece formed parts, are then poured or molded in, and finally separated into two halves, using a water jet, for example.

It is advantageous if the U-shaped cross section of the flux conductors extend along at least one circular path that is concentric with an axis of rotation of at least one of the clutch parts, and run around this axis of rotation, preferably annularly. The clutch part with the flux conductors positioned on it may then be configured in a rotationally symmetric manner. In this context, the friction clutch allows uniform frictional engagement, independent of the rotational angle of the clutch parts.

In a preferred embodiment of the present invention, a plurality of flux conductors are located on circular paths, that are approximately concentric to each other, at varying distances from the axis of rotation, the cross sectional area of the flux conductors in a plane, defined by the axis of rotation and a normal on the axis of rotation, decreasing as the distance from the axis of rotation increases, so that the magnetic flux density is approximately constant in the section of the magnetic circuit formed by the flux conductors, and the number of layers of the laminated cores of the flux conductors preferably also decreasing in the radial direction from inside to outside. The clutch parts then have only a relatively small quantity of soft magnetic material, despite good magnetic conductivity, resulting in even less magnetic energy in the magnetic circuit, and also making compact construction of the clutch parts possible with low mass inertia.

In an appropriate embodiment of the present invention, the clutch parts have friction linings, the friction lining of at least one clutch part being located between the U-legs of the flux conductors. In this instance, the friction lining is preferably made of a non-ferromagnetic material, i.e., it fulfills a dual function, namely establishing the frictionally engaged connection between the clutch parts and magnetically insulating the U-legs of the flux conductors from each other crosswise to their direction of extension.

It is advantageous if the second clutch part is configured as a thin disk positioned between the clamping jaws and preferably having slots in the soft magnetic material that extend, in a plurality of rows adjacent to each other, preferably on circular paths that are approximately concentric to the axis of rotation, a friction lining being located in the slots as necessary. In this configuration as well, the friction lining is preferably made of a non-ferromagnetic material, which is used to establish the frictionally engaged connection between the clutch parts and to magnetically insulate the webs of soft magnetic material, located between the slots in a radial direction, from each other.

In an appropriate embodiment of the present invention, the slots have interruptions at which the webs are connected with each other by cross-webs made of the soft magnetic material and running preferably radially to the axis of rotation. The disk-shaped second clutch part may then be manufactured inexpensively, for example by stamping from a metal sheet. In this context, the webs and cross-webs of the disk may be positioned directly in a prescribed position relative to each other and connected to one another. If appropriate, it is also conceivable for the second clutch part to have at least two layers of the soft magnetic material produced in this way and connected to one another, for example by an adhesive, to form a stack of layers. At the same time, the cross-webs of adjacent sequential layers are preferably offset from each other in the circumferential direction of the clutch part, in order to make high mechanical strength of the clutch part possible.

It is advantageous if the electromagnet is configured with a stationary coil, and if the clutch parts are mounted on a common shaft so that they may rotate relative to the coil and relative to each other. The coil may then be supplied with electric current in a simple manner via appropriate printed conductors. The clutch parts, each rotatably mounted relative to the coil, rotate jointly around the axis of rotation when the friction clutch is engaged, and may be rotated against one another when the friction clutch is disengaged. It is even possible, by applying appropriate current to the coil, to interrupt the friction connection only briefly in order to rotate the two clutch parts against one another at a predefined angle between zero and 60 degrees, for example. If appropriate, it is also possible for one of the clutch parts to be connected with the coil in a rotationally fixed manner. In this case, engaging the friction clutch may slow the other clutch part, which is rotating relative to the housing of the electric motor, down. It should also be mentioned that the friction clutch may also be used for a dual-mass flywheel, the one clutch part being connected with the one mass and the other clutch part with the other mass of the dual-mass flywheel. Engaging the friction clutch allows oscillations of the two masses relative to each other around a shaft to be damped.

The two air gaps are preferably positioned in such a way that the magnetic flux passes through them approximately radially to the axis of rotation. The magnetic forces acting between the clutch parts and the stationary core at the two air gaps are absorbed into the components and do not add to the load on the bearings.

It is advantageous if the clamping jaws are joined together in a rotationally fixed yet axially movable manner relative to the axis of rotation by toothing or a similar guiding element. This enables even better transfer of the frictional forces between the clutch parts. Another result is that the two clamping jaws are always in the same rotational position relative to each other.

In a particularly advantageous embodiment of the present invention, one of the clutch parts is connected in a rotationally fixed manner with a shaft, in particular a camshaft of an internal combustion engine, and the other clutch part is configured as a wheel having on its outer circumference a place of engagement for a belt, a chain or a similar traction means, preferably having a drive connection with a crankshaft of the internal combustion engine. At the same time, this embodiment of the present invention takes advantage of the fact that during operation of a combustion engine the camshaft, which is rotating in proportion to the crankshaft, has oscillations around its axis of rotation, which are transferred from the crankshaft to the camshaft via the traction means. These oscillations may be used to rotate the camshaft at a defined angle relative to the crankshaft, if, as during freewheeling, the torque transfer between the clutch parts utilizes only a half cycle of the torque oscillation for the adjusting procedure. The present invention may also be used in a corresponding manner for other systems having a main shaft and at least one secondary shaft rotating in proportion to the main shaft, in order to rotate the main shaft and the secondary shaft relative to each other.

It is advantageous if there is at least one permanent magnet positioned in the magnetic circuit to produce a magnetic flux, and if the electromagnet is configured to weaken and/or strengthen the magnetic flux produced in the magnetic circuit by the at least one permanent magnet. In applications in which the friction clutch is released only briefly, such as when rotating a camshaft of an internal combustion engine relative to a crankshaft, this measure makes it possible to reduce the current draw of the coil of the electromagnet, i.e., the coil essentially only needs to receive current when the clutch parts are in the disengaged position, while when the clutch parts are engaged, the magnetic flux is applied in the magnetic circuit by the permanent magnet(s).

It is especially advantageous if the cross section of the magnetic flux in the permanent magnet is at least six times, perhaps seven, in particular eight, and preferably ten times greater than the smallest flux cross section in the soft magnetic material. The permanent magnet may be constructed advantageously as a thin layer bound in plastic, and may then be operated at a working point at which its energy product is relatively large and in particular corresponds to the maximum energy product of the permanent magnet.

It is appropriate for the at least one permanent magnet to be positioned between the soft magnetic material and at least one air gap in such a way that one of its magnetic poles faces the air gap and its other magnetic pole faces the soft magnetic material. This results in a compactly constructed magnetic circuit. The magnetic pole may be applied between the soft magnetic material and the air gap as a coating.

The present invention also provides for a transducer element to be connected with the clutch parts in such a way that when the clutch parts rotate relative to each other, the transducer element moves relative to both clutch parts, and for a sensor for determining the position of the transducer element to be provided to measure indirectly the angle of rotation between the clutch parts. In an advantageous way, this makes it possible to measure the angle of rotation in a simple manner and with great precision, even when both clutch parts are in rotary motion. The sensor may even be placed in a fixed position. It is thus possible to avoid an inconvenient and complicated determination of the angle of rotation by recording the rotational speed or the angular velocity of the two clutch parts and integrating the corresponding measuring signals. The measuring device made up of the transducer element and the sensor and an adjustable current source for applying current to the coil of the electromagnet may be parts of a control loop for setting a prescribed or prescribable angle of rotation between the clutch parts. In the case of a friction clutch utilized in conjunction with a combustion engine, it is even possible for the control loop to be coupled with an engine control of the internal combustion engine.

It is advantageous for the transducer element to have a sliding connection with each of the individual clutch parts via a sliding guide, for the sliding directions of the sliding guides to be oblique with respect to each other in such a way that the transducer element moves toward the clutch parts or away from them when the clutch parts are rotated relative to each other, and for the sensor for measuring the displacement path of the transducer element preferably to be configured as a distance sensor. In particular, the sensor may be an inexpensive inductive axial travel sensor.

In a preferred embodiment, at least one sliding guide is configured in such a way that its displacement path runs along a spiral-shaped curved path that is coaxial with the axis of rotation of at least one of the clutch parts, and so that the sliding guide positioned on the other clutch part is preferably configured as a linear guide, the displacement path of which runs in the direction of extension of the axis of rotation. The sliding guide including the spiral-shaped displacement path may then be implemented inexpensively by at least one projection on a first guide part that engages with a spiral-shaped groove of a second guide part. In this case, one of these guide parts may be connected to a clutch part and the other to the transducer element.

It is appropriate for the position transducer to be configured as a ring element that is positioned approximately concentrically to an axis of rotation of at least one clutch part. The measuring system made up of the position transducer and the sensor then makes it possible to continuously record the angle of rotation between the clutch parts during rotary motion of the clutch parts.

BRIEF DESCRIPTION OF THE DRAWINGS

Exemplary embodiments of the present invention are subsequently explained in greater detail on the basis of the drawing.

DETAILED DESCRIPTION

Figure 1:
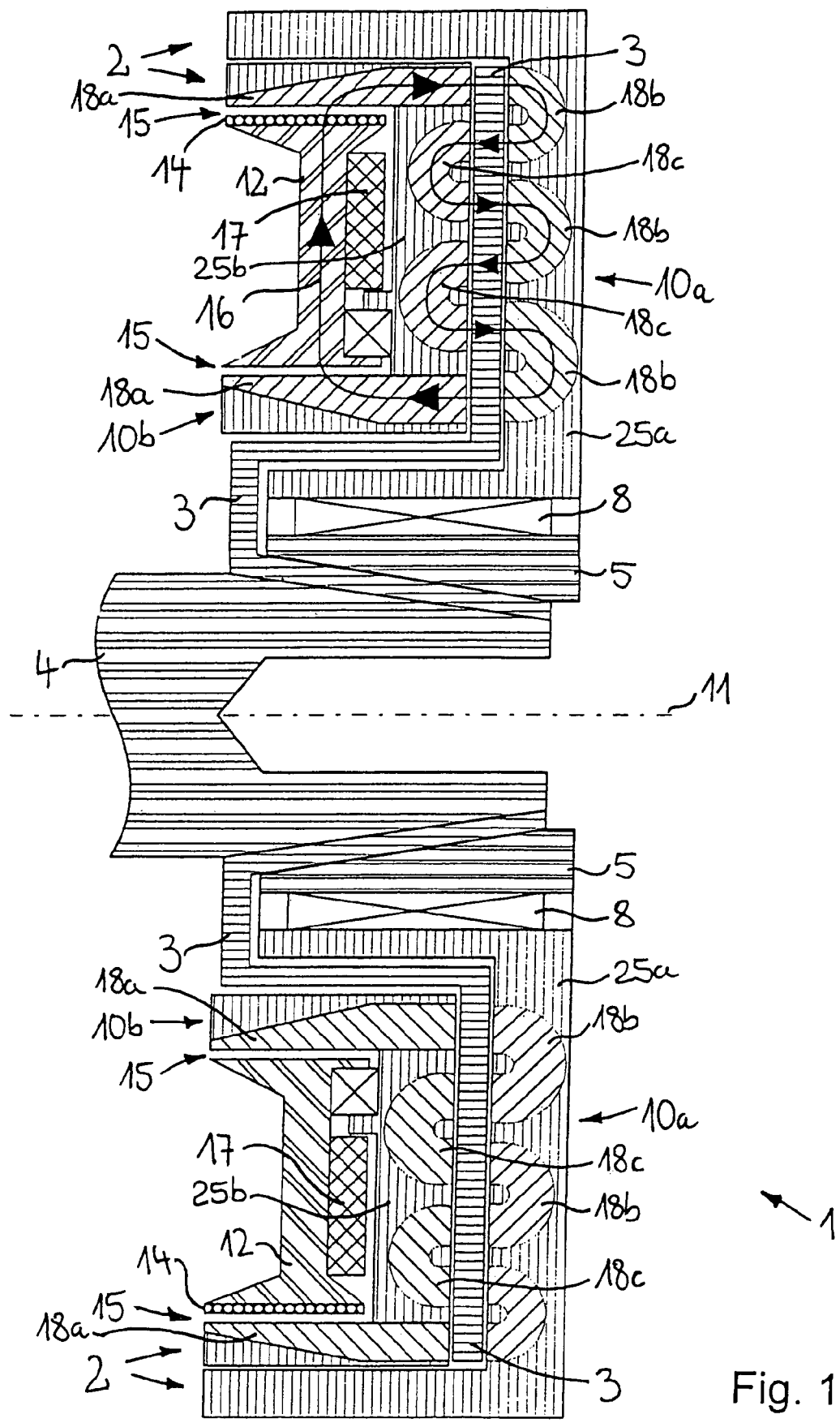
FIG. 1 shows a cross section through an electromagnetic friction clutch having two clutch parts that are rotatable relative to each other and through which a magnetic flux flows that is guided in the clutch parts in a soft magnetic material.
Figure 2:
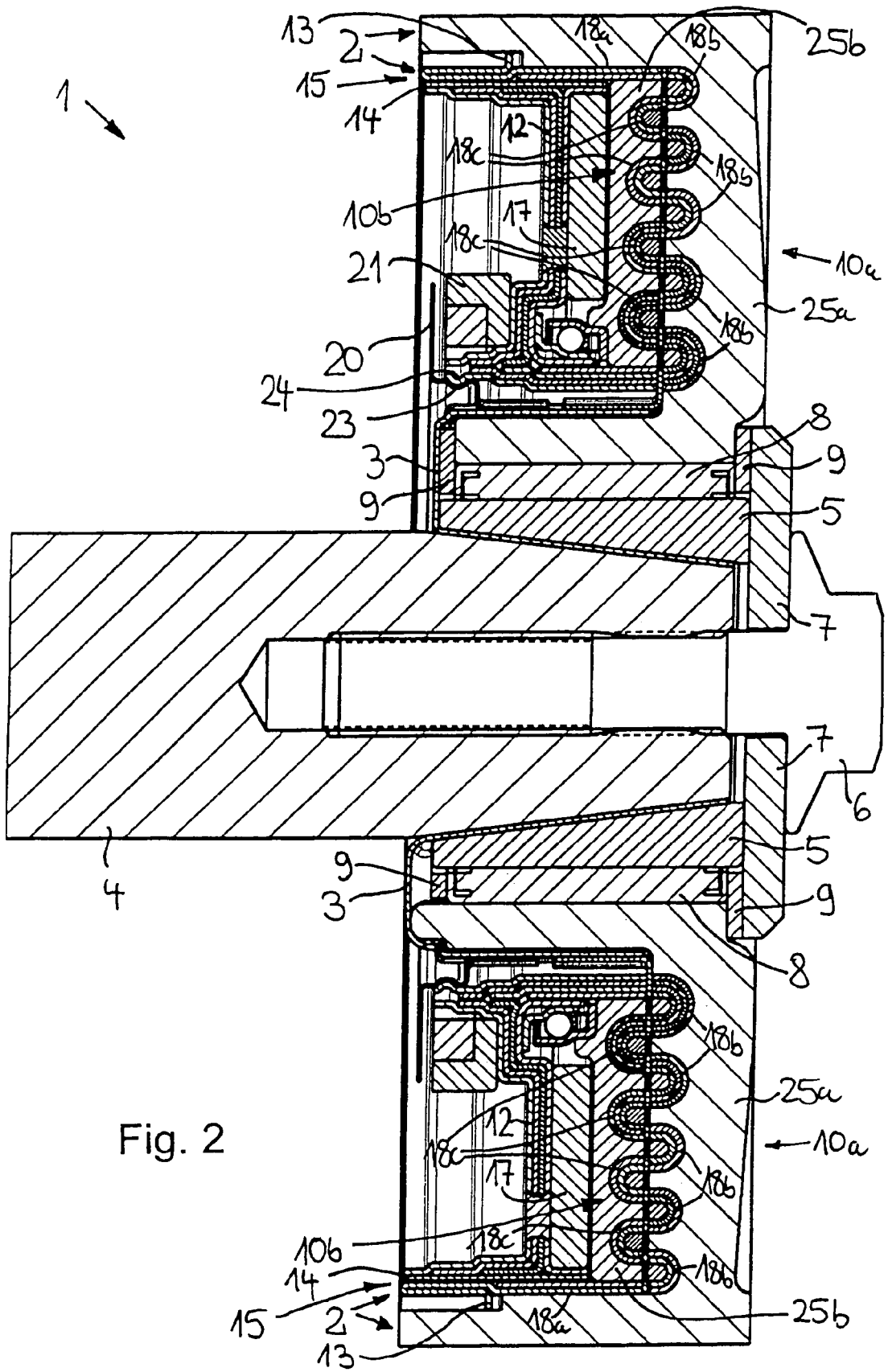
FIG. 2 shows a cross section through an electromagnetic friction clutch in which the soft magnetic material is in sheet form, the friction clutch having a sensor for detecting an angle of rotation at which the clutch parts are rotated relative to each other.

An electromagnetic friction clutch designated throughout as 1 has a first clutch part 2 and a second clutch part 3 rotatably mounted relative thereto, which are positioned on a shaft 4, which may be the camshaft of an internal combustion engine, for example. FIGS. 1 and 2 show that second clutch part 3 is connected to shaft 4 in a rotationally fixed manner via a conical sleeve 5. The inner conical surface of conical sleeve 5 is clamped against an outer conical surface of shaft 4 by a central screw 6 (FIG. 2), which is screwed into a threaded hole bored in an end of shaft 4. FIG. 2 shows that a plain washer 7 is situated between central screw 6 and the end of the conical sleeve. First clutch part 2 is connected with shaft 4 so that it is able to rotate around the axis of shaft 4, via a first roller bearing 8 positioned on the outer circumference of conical sleeve 5 and having needle rollers. Positioned axially on both sides of roller bearing 8 in the exemplary embodiment according to FIG. 2 are thrust washers 9.

First clutch part 2 has two clamping jaws 10a, 10b, which are movable toward and away from each other axially, i.e. parallel to axis 11 of shaft 4. An outer clamping jaw 10a has an annular design and has an approximately U-shaped ring cross section in a diameter plane that includes axis of rotation 11 of shaft 4 and a normal to this shaft 4 and may be, for example, the drawing plane in FIGS. 1 and 2. An inner U-leg of outer clamping jaw 10a is braced against roller bearing 8 in such a way that outer clamping jaw 10a is fixed on shaft 4 in the axial direction. On its outer circumference, outer clamping jaw 10*a* may have a place of engagement for a traction mechanism which may be, for example, a toothed belt driven by a crankshaft of an internal combustion engine that engages with toothing on the outer circumference of clamping jaw 10*a*.

Positioned between the U-legs of outer clamping jaw 10*a* is an inner clamping jaw 10*b*, which likewise has an annular design and is positioned approximately concentrically to clamping jaw 10*a*. Inner clamping jaw 10*b* has an approximately U-shaped ring cross section in the drawing plane and is positioned in outer clamping jaw 10*a* in such a way that the free ends of the U-legs of inner clamping jaw 10*b* point in the same direction as the U-legs of outer clamping jaw 10*a*. Inner clamping jaw 10*b* is connected to a fixed soft magnetic core 12 of an electromagnet via a second roller bearing in the form of a ball bearing, so that it is rotatable around axis of rotation 11 and movable toward and away from soft magnetic core 12 in the direction of axis of rotation 11. Stationary core 12 is held by a support, which may be attached, for example, to the engine block of an internal combustion engine.

As shown in FIG. 2, the clamping jaws may be connected to each other in a rotationally fixed manner by toothing 13 provided on their outer leg parts and engaged with each other in such a way that inner clamping jaw 10*b* may be shifted slightly in the axial direction on shaft 4 and is thereby movable toward and away from outer clamping jaw 10*a*. When inner clamping jaw 10*b* is in an engaged position, second clutch part 3 is firmly clamped between it and outer clamping jaw 10*a* by a clamping force brought about by a magnetic flux flowing through clutch parts 2, 3. The clamping force is such that clamping jaws 10*a*, 10*b* are in a non-slip frictional engagement with each other. In a disengaged position, clutch parts 2, 3 are rotatable in relation to each other.

The magnetic flux is produced by a permanent magnet 14 positioned in a magnetic circuit which passes through the two clamping jaws 10*a*, 10*b* of first clutch part 2, second clutch part 3, stationary core 12, and two air gaps 15 located between stationary core 12 and second clutch part 3. Stationary core 12 and the areas of clutch parts 2, 3 directing the magnetic flux are made of a soft magnetic material. In the upper half of FIG. 1, the magnetic flux is indicated by a flux line 16 and the direction of flow is indicated by arrows.

The electromagnet provided for engaging and disengaging friction clutch 1 has a coil 17 on soft magnetic core 12, which runs around axis of rotation 11 in the circumferential direction in a plurality of windings. The electromagnet thus is comprised of core 12 and coil 17. Coil 17 may be supplied with current through electrical connectors in such a way that it produces a magnetic field counter to the magnetic field of permanent magnet 14, which weakens the magnetic flux in the magnetic circuit at least to the extent that the force caused by the flux, which presses clamping jaws 10*a*, 10*b* against second clutch part 3, is reduced so that slippage occurs between clutch parts 2, 3. The magnetic flux of permanent magnet 14 is dimensioned such that when there is no current in coil 17, clutch parts 2, 3 transfer the acting torques to each other.

The magnetic flux is guided in clutch parts 2, 3 in such a way that it changes between clutch parts 2, 3 at twelve flux crossover points positioned one after the other in the direction of flow in the exemplary embodiment according to FIG. 1, and at twenty points in the exemplary embodiment according to FIG. 2. In this context, the magnetic flux passes in each case several times in a row from the one clamping jaw 10*a* through second clutch part 3 to the other clamping jaw 10*b*, and then from the latter back through second clutch part 3 to the first-named clamping jaw 10*a*. Therefore, only relatively little magnetic energy is needed in the magnetic circuit to apply the clamping force to clamping jaws 10*a*, 10*b*.

FIGS. 1 and 2 show that each clamping jaw of first clutch part 2 has a support 25*a*, 25*b*, respectively, made of a non-ferromagnetic material, such as aluminum, and positioned on which are a plurality of soft magnetic flux conductors 18*a*, 18*b*, 18*c* offset from each other, of which each flux conductor 18*a* connects one air gap 15 with a flux crossover point, and each flux conductor 18*b*, 18*c* connects two flux crossover points positioned adjacent to each other radially to axis of rotation 11 and at a distance from each other, for example in a U shape. It is clearly recognizable that each free end of the U-legs of flux conductors 18*b*, 18*c* face second clutch part 3. Flux conductors 18*b*, 18*c* have an annular design and run approximately concentrically to axis of rotation 11 in a plurality of rows at a distance from each other and transverse to axis of rotation 11. All in all this results in a magnetic flux path having alternating right and left bends in the direction of flow, flux conductors 18*c*, which are curved to the right, being positioned in the clamping jaw 10*b*, and flux conductors 18*b*, which are curved to the left, being positioned in the other clamping jaw 10*a*. Flux conductors 18*a* also have an annular design and are positioned concentrically to axis of rotation 11.

In the exemplary embodiment according to FIG. 2, it is recognizable that each flux conductor 18*b*, 18*c* is inserted or embedded in the non-ferromagnetic support material 25*a*, 25*b* of clamping jaws 10*a*, 10*b*. Provided between the U-legs of the individual flux conductors are spaces that are filled with a non-ferromagnetic friction lining.

Figure 3:
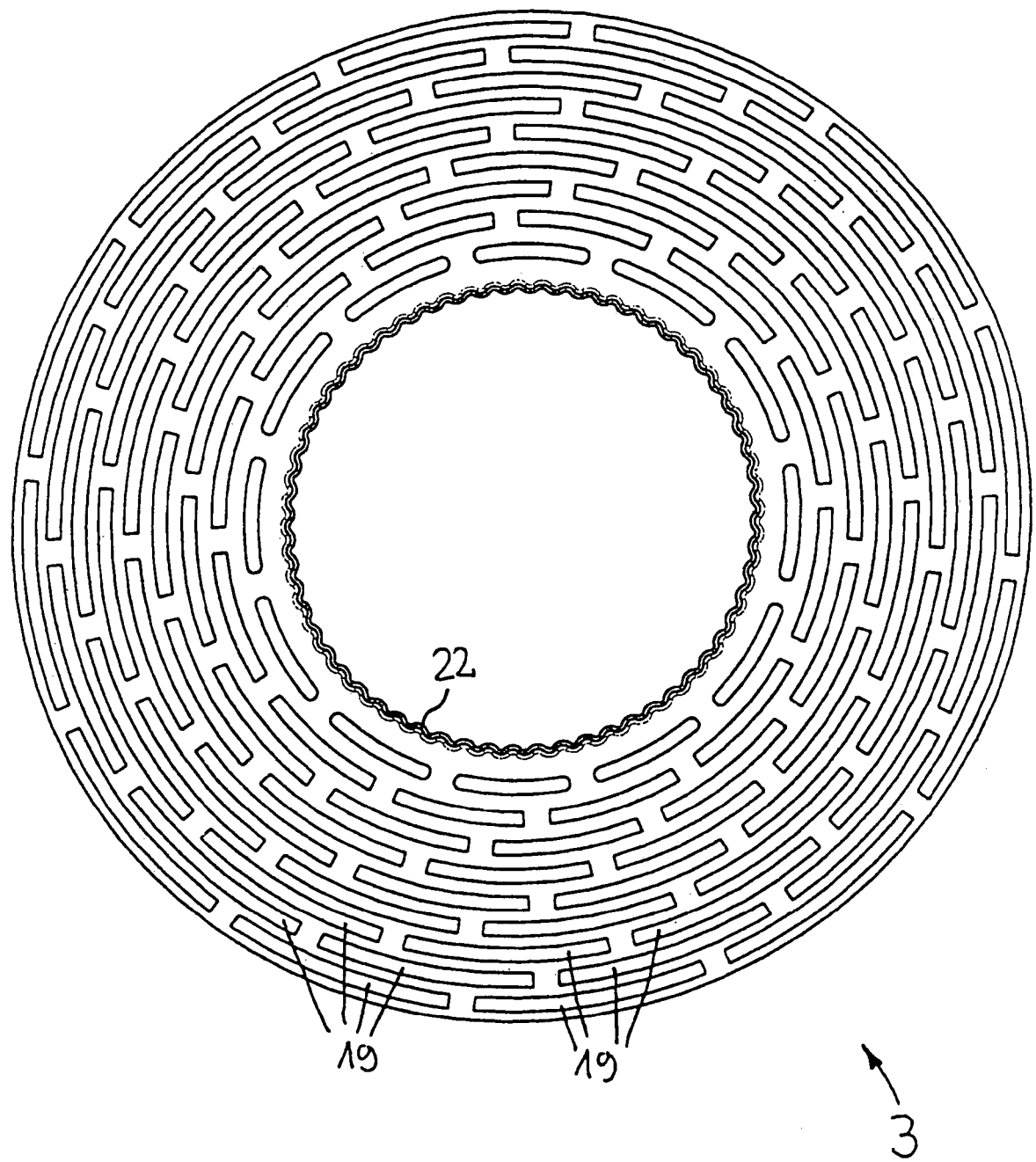
FIG. 3 shows a top view of a disk-shaped clutch part of an electromagnetic friction clutch.

FIG. 3 shows that second clutch part 3 is configured as a thin disk having slots 19 in the soft magnetic material that are arranged in a plurality of adjacent rows and run along circular paths that are arranged approximately concentrically to axis of rotation 11. Formed between slots 19 are soft magnetic webs, which run around axis of rotation 11 and are at a distance from each other in the radial direction. It is also recognizable that slots 19 have interruptions at which the webs are connected by soft magnetic cross-webs that run approximately radially to axis of rotation 11. Slots 19 are filled with a friction lining that interacts with the friction linings of clamping jaws 10*a*, 10*b* when friction clutch 1 is in the engaged position.

Air gaps 15 between stationary core 12 and flux conductors 18*a* run in the circumferential direction concentrically around axis of rotation 11 (FIGS. 1 and 2). As may be seen particularly well in FIG. 1, the magnetic flux flows radially through the air gaps. In the exemplary embodiment according to FIG. 2, the cross section of the magnetic flux in each of the two air gaps 15 is at least five times greater than the smallest flux cross section in the soft magnetic material of the magnetic circuit. Consequently, only minimal magnetic energy is stored in the air gaps, even when there is no current in coil 17. This results in correspondingly high adjustment dynamics of slip clutch 1. Permanent magnet 14 is positioned at the air gap. The cross section of the magnetic flux in the permanent magnet is at least a multiple of the smallest flux cross section in the components of the magnetic circuit. As a result, a low flux density in the permanent magnet is achieved, and the permanent magnet may be operated close to the maximum energy product.

In the exemplary embodiment shown in FIG. 2, the soft magnetic material of the magnetic circuit is configured as a laminated core having layers that are electrically insulated from each other crosswise to the direction of flow. It is clearly recognizable that the cross sectional area of flux conductors 18*b*, 18*c* in the drawing plane decreases at clamping jaws 10*a*, 10b with increasing distance from axis of rotation 11. This is achieved by having the number of layers in the laminated cores of flux conductors 18b, 18c decrease in the radial direction from inside to outside. This measure enables the magnetic flux density in the section of the magnetic circuit formed by flux conductors 18b, 18c to be approximately constant, i.e., the outwardly decreasing cross section of the soft magnetic material is approximately compensated for by the outwardly increasing circumference of annular flux conductors 18b, 18c in terms of the cross sectional area of flux conductors 18b, 18c.

Figure 4:
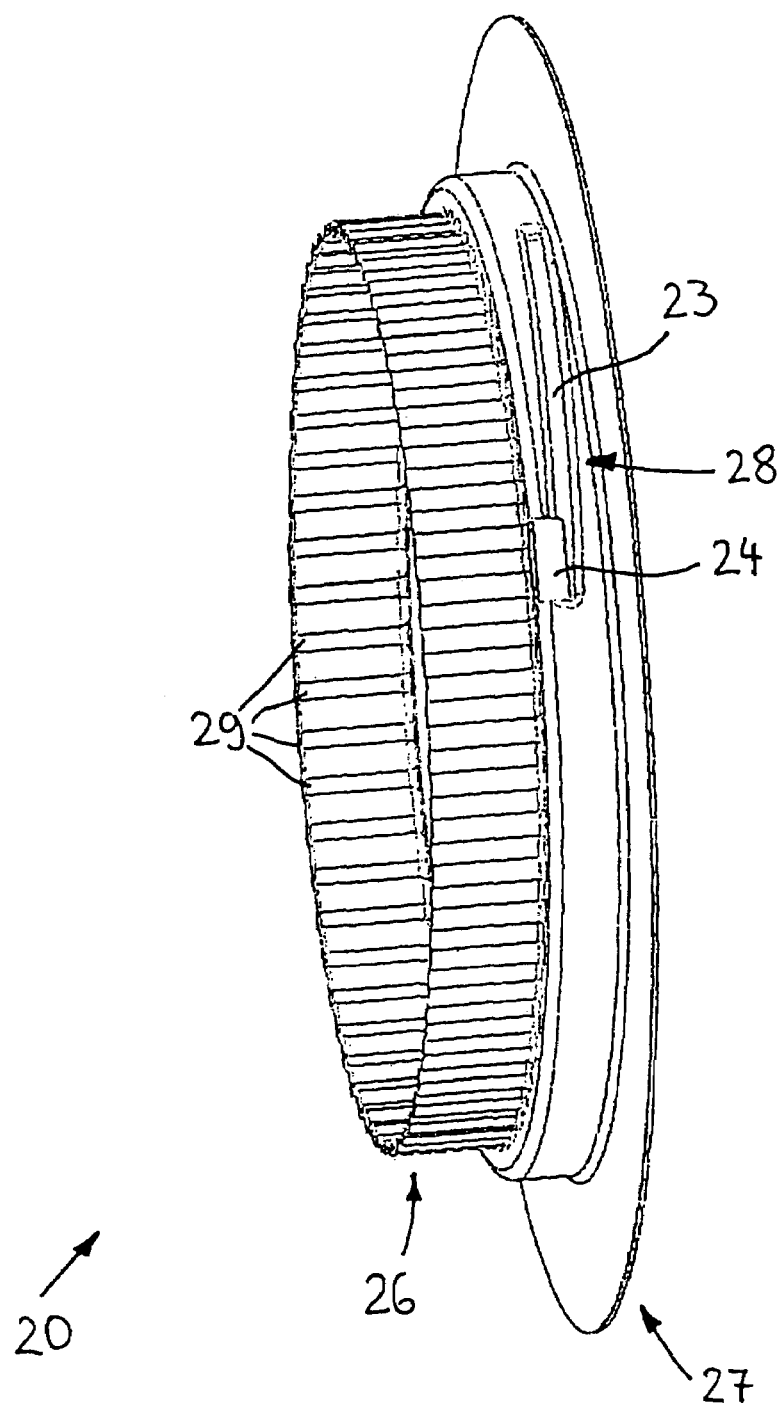
FIG. 4 shows a transducer element of the angle sensor, which has a groove into which a projection of the clutch part engages, the clutch part being depicted only in the area of the projection.

FIGS. 2 and 4 show that friction clutch 1 has a transducer element 20, which is configured as a ring element positioned concentrically to axis of rotation 11. The ring cross section of transducer element 20 is formed, for example, in an L shape with two leg parts, in a plane defined by axis of rotation 11 and a normal to axis of rotation 11, the one leg part having approximately the form of a sleeve 26 concentric to axis of rotation 11 and the other leg part being configured as a ring flange 27, the flange plane being approximately positioned at right angles to axis of rotation 11. Transducer element 20 is connected to external clamping jaw 10a of first clutch part 2 via a first sliding guide located on sleeve 26 in a manner movable in the direction of axis of rotation 11, and is connected to second clutch part 3 via a second sliding guide 28 in a manner movable at an angle to the direction of displacement of the first sliding guide, in such a way that when clutch parts 2, 3 are rotated relative to each other, transducer element 20 moves axially with respect to shaft 4. To indirectly measure the angle of rotation between clutch parts 2, 3, there is a sensor 21 for detecting the position of the transducer element; in the exemplary embodiment according to FIG. 2, this sensor is configured as an inductive distance sensor.

The first sliding guide is configured as a linear guide and has toothing 29 on transducer element 20, the teeth running parallel to axis of rotation 11 and engaging with matching opposing toothing 22 located on second clutch part 3. With the help of the first sliding guide, transducer element 20 is connected to second clutch part 3, and thus also with shaft 4, so that it is axially movable and rotationally fixed.

As shown schematically in FIG. 4, the second sliding guide at transducer element 20 has a groove 23 that extends along a spiral-shaped curved path that runs coaxially to axis of rotation 11. On inner clamping jaw 10b of the first clutch part, there is a projection 24, which matches groove 23 and, when inserted into groove 23, may be moved along the spiral-shaped curved path relatively to transducer element 20.

LIST OF ELEMENTS 1 electromagnetic friction clutch
2 first clutch part
3 second clutch part
4 shaft
5 conical sleeve
6 central screw
7 plain washer
8 first roller bearing
9 thrust washers
10a outer clamping jaw
10b inner clamping jaw
11 axis of rotation
12 soft magnetic (stationary) core 12
13 toothing
14 permanent magnet
15 air gap
16 flux line
17 coil
18a flux conductor
18b flux conductor
18c flux conductor
19 slot
20 transducer element
21 sensor
22 toothing
23 groove
24 projection
25a support material
25b support material
26 sleeve
27 ring flange
28 sliding guide
29 toothing

What is claimed is:

1. An electromagnetic friction clutch comprising:
a first clutch part and a second clutch part mounted so as to be rotatable relative to each other, the first clutch part having a soft magnetic material defining at least part of a magnetic circuit, the magnetic circuit having a magnetic force for pressing the first and second clutch parts together; and
at least one electromagnet being situated in the magnetic circuit to change the magnetic flux in the first and second clutch parts;
the magnetic circuit being guided in the first and second clutch parts in such a way that the magnetic flux changes at least ten flux crossover points one after the other in a direction of flow of the magnetic circuit between the first and second clutch parts
wherein the first clutch part includes a first clamping jaw and a second clamping jaw movable with respect to each other and the second clutch part is configured as a disk positioned between the first and second clamping jaws.

2. The electromagnetic friction clutch as recited in claim 1 wherein the soft magnetic material is at least partially configured as a laminated core having layers electrically insulated from each other at right angles to the direction of flow.

3. The electromagnetic friction clutch as recited in claim 1 wherein the electromagnet includes a coil and a soft magnetic core, the magnetic circuit having air gaps between the soft magnetic core and at least one of the first and second clutch parts, a cross section of the magnetic flux in the at least one air gap being at least five times greater than a smallest flux cross section in the soft magnetic material of the first clutch part.

4. The electromagnetic clutch as recited in claim 3 wherein the cross section of the magnetic flux in the air gaps is at least six times greater than the smallest flux cross section in the soft magnetic material.

5. The electromagnetic clutch as recited in claim 4 wherein the cross section of the magnetic flux in the air gaps is at least ten times greater than the smallest flux cross section in the soft magnetic material.

6. The electromagnetic friction clutch as recited in claim 1 wherein the first clutch part includes a first clamping jaw and a second clamping jaw movable with respect to each other, the second clutch part being positioned between the first and second clamping jaws, the soft magnetic material being positioned so that the magnetic flux changes at least once from the first clamping jaw through the second clutch part to second clamping jaw, and from the second clamping jaw back through the second clutch part to the first clamping jaw.

7. The electromagnetic friction clutch as recited in claim 1 wherein the first clutch part has at least one non-ferromagnetic support having a plurality of flux conductors made of the soft magnetic material positioned at a distance from each other, each flux conductor joining at least two flux crossover points with each other.

8. The electromagnetic friction clutch as recited in claim 7 wherein the flux conductors have a U-shaped cross-section, free ends of the U-shaped cross-section facing the flux crossover points.

9. The electromagnetic friction clutch as recited in claim 8 wherein the U-shaped cross sections of the flux conductors extend along at least one circular path concentric to an axis of rotation of at least one of the first and second clutch parts.

10. The electromagnetic friction clutch as recited in claim 9 wherein the circular path is an annular path.

11. The electromagnetic friction clutch as recited in claim 7 wherein a plurality of flux conductors are positioned on circular paths concentric with each other at varying distances from an axis of rotation of at least one of the first and second clutch parts, a cross-sectional area of the flux conductors in a plane defined by the axis of rotation and a normal to the axis of rotation decreasing as the distance from the axis of rotation increases so that the magnetic flux density is similar in the section of the magnetic circuit formed by the flux conductors.

12. The electromagnetic friction clutch as recited in claim 11 wherein the soft magnetic material is made of laminated layers, a number of the layers decreasing from inside to outside in the radial direction.

13. The electromagnetic friction clutch as recited in claim 8 wherein the first and second clutch parts have friction linings, the friction lining for the first clutch part being located between the free-ends of the U-shaped cross-section of the flux conductors.

14. The electromagnetic friction clutch as recited in claim 1 wherein the disk includes a soft magnetic material and has slots extending in the soft magnetic material of the disk in a plurality of rows adjacent to each other.

15. The electromagnetic friction clutch as recited in claim 14 wherein the slots extend on circular paths concentric to an axis of rotation.

16. The electromagnetic friction clutch as recited in claim 14 wherein disk includes a friction material in the slots.

17. The electromagnetic friction clutch as recited in claim 14 wherein the slots are defined by webs connected to each other by cross-webs of the soft magnetic material.

18. The electromagnetic friction clutch as recited in claim 17 wherein the cross-webs run radially to the axis of rotation.

19. The electromagnetic friction clutch as recited in claim 1 wherein the electromagnet includes a stationary coil, the clutch parts being mounted on a common shaft so as to be rotatable relative to the coil and relative to each other.

20. The electromagnetic friction clutch as recited in claim 1 wherein the electromagnet includes a coil and a soft magnetic core, the magnetic circuit having air gaps between the soft magnetic core and at least one of the first and second clutch parts, the air gaps being positioned in such a way that the magnetic flux passes through the air gaps radially to an axis of rotation.

21. The electromagnetic friction clutch as recited in claim 1 wherein the first clutch part includes a first and second clamping jaw, with the second clutch part being located between the first and second clutch parts, the first and second clamping jaws being connected to each other via toothing or a guide element in a rotationally fixed yet axially movable manner in relation to a axis of rotation.

22. The electromagnetic friction clutch as recited in claim 1 wherein the first clutch part is connected in a rotationally fixed manner with a shaft and the second clutch part is configured as a wheel with an outer circumference for engaging a belt, a chain, or other drive device.

23. The electromagnetic friction clutch as recited in claim 22 wherein the shaft is a camshaft of an internal combustion engine and the belt, chain or other drive device has a drive connection with a crankshaft of the internal combustion engine.

24. The electromagnetic friction clutch as recited in claim 1 wherein at least one permanent magnet is situated in the magnetic circuit to produce at least part of the magnetic flux, the electromagnet being configured to weaken and/or strengthen the magnetic flux produced by the at least one permanent magnet in the magnetic circuit.

25. The electromagnetic friction clutch as recited in claim 24 wherein a cross section of the magnetic flux in the permanent magnet is at least six times greater than a smallest flux cross section in the soft magnetic material.

26. The electromagnetic friction clutch as recited in claim 25 wherein the cross section of the magnetic flux in the permanent magnet is at least ten times greater than the smallest flux cross section in the soft magnetic material.

27. The electromagnetic friction clutch as recited in claim 25 wherein the at least one permanent magnet is positioned between at least one air gap and a soft magnetic material of the electromagnet or the soft magnetic material of the first clutch part so that one of the magnetic poles of the permanent magnet faces the air gap and the other magnetic pole faces the soft magnetic material of the electromagnet or the first clutch part.

28. The electromagnetic friction clutch as recited in claim 1 wherein the first clutch part is movable toward and away from the second clutch part.

29. An electromagnetic friction clutch comprising:
a first clutch part and a second clutch part mounted so as to be rotatable relative to each other, the first clutch part having a soft magnetic material defining at least part of a magnetic circuit, the magnetic circuit having a magnetic force for pressing the first and second clutch parts together;
at least one electromagnet being situated in the magnetic circuit to change the magnetic flux in the first and second clutch parts;
the magnetic circuit being guided in the first and second clutch parts so that the magnetic flux changes at at least five flux crossover points one after the other in a direction of flow of the magnetic circuit between the first and second clutch parts, the soft magnetic material being at least partially configured as a laminated core having layers electrically insulated from each other at right angles to the direction of flow.

30. An electromagnetic friction clutch comprising:
a first clutch part and a second clutch part mounted so as to be rotatable relative to each other, at least one of the first and second clutch parts having a soft magnetic material defining at least part of a magnetic circuit, the magnetic circuit having a magnetic force for pressing the first and second clutch parts together;
at least one electromagnet being situated in the magnetic circuit to change the magnetic flux in the first and second clutch parts, the electromagnet having a coil and a soft magnetic core, and the magnetic circuit having air gaps between the soft magnetic core and at least one of the first and second clutch parts,
a cross section of the magnetic flux in at least one air gap being at least five times greater than a smallest flux cross section in the soft magnetic material of the magnetic circuit.

* * * * *